(12) United States Patent
Ishizaki et al.

(10) Patent No.: US 9,997,066 B2
(45) Date of Patent: Jun. 12, 2018

(54) OPTICAL FIBER NETWORK FOR TRANSMITTING SIGNALS IN A ROBOT

(71) Applicant: HONDA MOTOR CO., LTD., Tokyo (JP)

(72) Inventors: Ryusuke Ishizaki, Wako (JP); Shingo Iwasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days. days.

(21) Appl. No.: 15/493,601

(22) Filed: Apr. 21, 2017

(65) Prior Publication Data
US 2017/0309169 A1  Oct. 26, 2017

(30) Foreign Application Priority Data
Apr. 25, 2016 (JP) .................. 2016-087479

(51) Int. Cl.
| | |
|---|---|
| H04B 10/07 | (2013.01) |
| H04B 10/275 | (2013.01) |
| G08C 23/04 | (2006.01) |
| H04B 10/40 | (2013.01) |
| G02B 6/44 | (2006.01) |
| B25J 9/00 | (2006.01) |

(52) U.S. Cl.
CPC .......... *G08C 23/04* (2013.01); *B25J 9/0009* (2013.01); *G02B 6/4463* (2013.01); *H04B 10/40* (2013.01)

(58) Field of Classification Search
CPC ........ G08C 23/04; H04B 10/40; B25J 9/0009; G02B 6/4463
USPC .......................................... 398/25–38, 58–64
See application file for complete search history.

(56) References Cited

U.S. PATENT DOCUMENTS

| | | | | |
|---|---|---|---|---|
| 4,814,761 A | * | 3/1989 | Takahashi ............. | H04L 7/0008 398/154 |
| 4,882,580 A | * | 11/1989 | Teranishi .............. | H04L 12/437 398/140 |
| 4,937,811 A | * | 6/1990 | Harris .................... | H04L 12/10 370/200 |
| 5,155,726 A | * | 10/1992 | Spinney ................ | H04L 5/1423 370/258 |
| 5,343,397 A | * | 8/1994 | Yoshino ............... | B62D 57/032 318/568.16 |
| 5,349,277 A | * | 9/1994 | Takahashi ............ | B62D 57/032 318/568.1 |

(Continued)

FOREIGN PATENT DOCUMENTS

JP      2015174208 A     10/2015

*Primary Examiner* — Ken N Vanderpuye
*Assistant Examiner* — Dibson Sanchez
(74) *Attorney, Agent, or Firm* — Armstrong Teasdale LLP

(57) ABSTRACT

In an optical fiber network for transmitting optical signals in a robot having three or more joints connecting a plurality of links in series such that the links include two end links located at either end and intermediate links provided between the two end links, and the links connected by the joints are moveable relative to each other, a plurality of optical transceiver modules are provided on the links such that at least one optical transceiver module is provided on each link; and a plurality of optical fiber cables connect the optical transceiver modules in a ring; wherein at least one end of each optical fiber cable connecting the optical transceiver modules provided on different links is connected to one of the optical transceiver modules provided on the intermediate links.

5 Claims, 8 Drawing Sheets

(56) References Cited

U.S. PATENT DOCUMENTS

| | | | | |
|---|---|---|---|---|
| 5,552,921 A * | 9/1996 | Hetzel | B60R 16/0315 | 370/389 |
| 5,663,818 A * | 9/1997 | Yamamoto | H04Q 11/0001 | 398/1 |
| 5,668,716 A * | 9/1997 | Otomo | G06F 13/4295 | 700/2 |
| 6,002,996 A * | 12/1999 | Burks | H04L 7/0008 | 370/280 |
| 6,330,494 B1 * | 12/2001 | Yamamoto | B25J 9/1674 | 700/261 |
| 6,564,888 B1 * | 5/2003 | Gomi | B62D 57/032 | 180/8.6 |
| 7,072,740 B2 * | 7/2006 | Iribe | B62D 57/032 | 180/8.1 |
| 7,278,501 B2 * | 10/2007 | Mori | B25J 9/1641 | 700/253 |
| 7,418,312 B2 * | 8/2008 | Hidai | B62D 57/032 | 318/568.12 |
| 7,657,345 B2 * | 2/2010 | Endo | B25J 9/161 | 318/568.17 |
| 7,761,184 B2 * | 7/2010 | Moridaira | B25J 9/1674 | 318/568.12 |
| 7,865,267 B2 * | 1/2011 | Sabe | G06K 9/00201 | 700/245 |
| 7,881,824 B2 * | 2/2011 | Nagasaka | B25J 13/085 | 700/245 |
| 7,882,289 B2 * | 2/2011 | Furuya | G06F 13/4247 | 710/106 |
| 7,949,428 B2 * | 5/2011 | Endo | B25J 9/161 | 318/567 |
| 8,315,454 B2 * | 11/2012 | Tanaka | G06N 3/008 | 700/245 |
| 8,463,433 B2 * | 6/2013 | Nagasaka | B25J 13/084 | 700/245 |
| 2001/0043775 A1 * | 11/2001 | Shirakawa | G02B 6/3829 | 385/59 |
| 2003/0072061 A1 * | 4/2003 | Ishii | H04B 10/2581 | 398/141 |
| 2004/0088436 A1 * | 5/2004 | Katta | H04L 25/062 | 709/248 |
| 2004/0133308 A1 * | 7/2004 | Kato | G06N 3/008 | 700/258 |
| 2004/0172165 A1 * | 9/2004 | Iribe | B62D 57/032 | 700/245 |
| 2005/0232632 A1 * | 10/2005 | Okubo | H04B 10/27 | 398/71 |
| 2005/0286892 A1 * | 12/2005 | Okubo | H04L 12/437 | 398/71 |
| 2006/0126498 A1 * | 6/2006 | Gross | H04L 12/423 | 370/216 |
| 2008/0052417 A1 * | 2/2008 | Aoyama | H04L 1/0045 | 710/1 |
| 2011/0052194 A1 * | 3/2011 | Lee | H04B 10/275 | 398/59 |
| 2013/0090762 A1 * | 4/2013 | Asai | H04J 3/0658 | 700/248 |

* cited by examiner

US 9,997,066 B2

OPTICAL FIBER NETWORK FOR TRANSMITTING SIGNALS IN A ROBOT

TECHNICAL FIELD

The present invention relates to an optical fiber network for transmitting signals in a robot.

BACKGROUND ART

It is known to use optical fibers to transmit signals in a robot. For example, JP2015-174208A discloses a robot in which optical communication is performed through a signal line to reduce noise interference caused by capacitive coupling between the signal line and the power line. Particularly, JP2015-174208A discloses disposing an optical communication unit on a pivot shaft of a joint connecting first and second arms (links) of the robot, wherein the optical communication unit includes an optical transmitter and an optical receiver.

A robot typically includes multiple joints connecting multiple links, and it may be conceived to provide controllers on the links of the robot to control the joints. To allow the controllers to operate cooperatively to appropriately control the attitude of the robot, it is necessary to communicably connect the controllers with each other. For this purpose, each controller may be equipped with an optical transceiver unit, such that the optical transceiver units of different controllers are connected via optical fiber cables to constitute an optical fiber network to transmit optical signals for controlling the joints of the robot in a coordinated manner. Each optical fiber cable used in the communication between the optical transceiver units provided on different links may be routed to pass through multiple joints each including one or more pivot shafts. The optical fiber cable passed through the joints may be bent at each joint, and an optical signal carried on the optical fiber is attenuated at each bend of the optical fiber cable. In a case where the optical signal transmitted from one optical transceiver unit passes through many bends formed at joints, the power of the optical signal may be attenuated to such an extend that, when the optical signal is received by another optical transceiver unit after having propagated through the optical fiber cable, the power of the optical signal may be insufficient for the other optical transceiver unit to receive and process the optical signal.

SUMMARY OF THE INVENTION

In view of such prior art problems, a primary object of the present invention is to provide an optical fiber network for a robot having multiple joints connecting multiple links, in which optical transceiver modules provided on the links are communicably connected with each other via optical fiber cables and attenuation (or transmission loss) of optical signals propagating through the optical fiber cables is suppressed.

To achieve the above object, one aspect of the present invention provides an optical fiber network (9; 39) for transmitting optical signals in a robot having three or more joints (WJ, JR, KR; ZL) connecting a plurality of links (BA, BH, L1, L2; Z1-Z14) in series such that the links include two end links (BA, L2; Z1, Z14) located at either end and intermediate links (BH, L1; Z2-Z13) provided between the two end links, and the links connected by the joints are moveable relative to each other, the optical fiber network comprising: a plurality of optical transceiver modules (BO1, BO5, LO1. LO2. LO3; Z0) provided on the links such that at least one optical transceiver module is provided on each link; and a plurality of optical fiber cables (1-5; 39T-1 to 39T-8, 39R-1 to 39R-8) connecting the optical transceiver modules in a ring; wherein at least one end of each optical fiber cable connecting the optical transceiver modules provided on different links is connected to one of the optical transceiver modules provided on the intermediate links. Each joint may include one or more couplings (B1, B2, JR1-JR3, KR1) allowing the links connected thereby to pivot around respective axes.

According to the above arrangement, the optical fiber network does not comprise an optical fiber cable that directly connects the optical transceiver modules which are provided on the respective end links and hence passes through the all joints connecting the links in series, which would lead to a large transmission loss. Namely, in the optical fiber network configured as above, the transmission loss is reduced compared to a case where the optical fiber network includes an optical fiber cable that directly connects the optical transceiver modules which are provided on the respective end links. Thus, according to the aspect of the present invention, an optical fiber network for a robot having multiple joints connecting multiple links is provided, in which optical transceiver modules provided on the links are communicably connected with each other via optical fiber cables and attenuation (or transmission loss) of optical signals propagating through the optical fiber cables is suppressed.

Preferably, each optical fiber cable passes through less than three (namely, one or two) joints.

Thereby, the transmission loss in each optical fiber cable can be reduced compared to a case where the optical fiber cable passes three or more joints.

Further preferably, at least one of the optical fiber cables connects the optical transceiver modules provided on a pair of links connected with each other via one link on which at least one optical transceiver module is provided.

Such a configuration allows the optical transceiver modules provided on the links connected in series by the joints to be connected in a ring easily by the optical fiber cables each passing through less than three joints.

Also preferably, the optical fiber cables are arranged such that the largest of transmission losses in the optical fiber cables caused due to the joints passed through by the respective optical fiber cables is minimized.

Thereby, the transmission loss in the optical fiber network can be suppressed even more effectively.

Also preferably, the plurality of optical fiber cables constitute a first optical fiber cable set carrying optical signals from the optical transceiver module provided on one of the two end links toward the optical transceiver module provided on the other of the two end links without reversing, and a second optical fiber cable set carrying optical signals from the optical transceiver module provided on the other of the two end links toward the optical transceiver module provided on the one of the two end links without reversing.

Thereby, only two optical fiber cables (one included in the first optical fiber cable set, the other included in the second optical fiber cable set) pass through each of the joints connecting the links. Therefore, the structure can be made simpler compared to a case where three or more optical fiber cables are passed through each joint.

BRIEF DESCRIPTION OF THE DRAWING(S)

DESCRIPTION OF THE PREFERRED EMBODIMENT(S)

Preferred embodiments of the present invention are described in the following with reference to the appended drawings.

Figure 1:
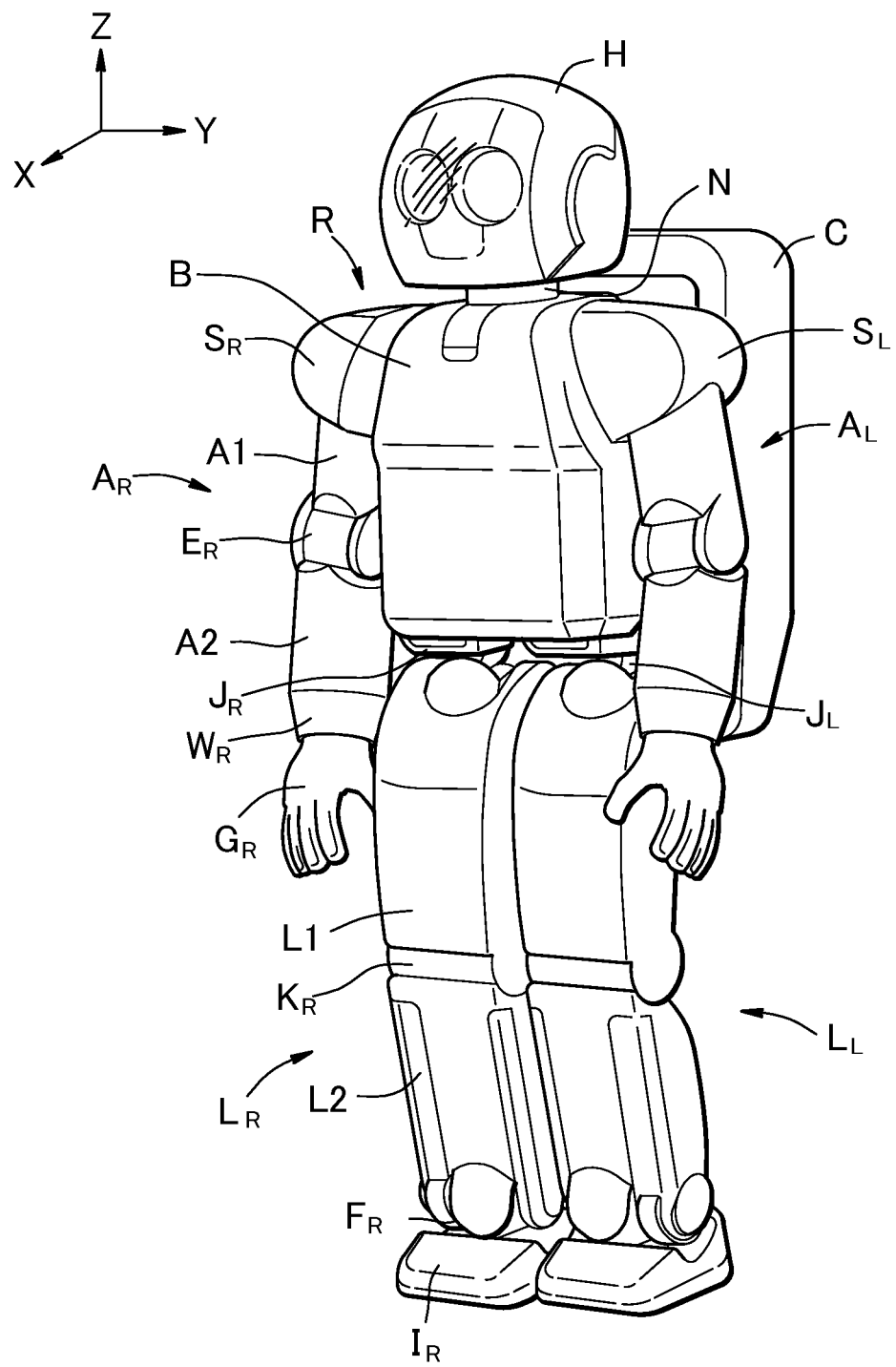
FIG. 1 is a perspective view of a robot which has multiple joints and to which the present invention is applied.

As shown in FIG. 1, the robot R of the illustrated embodiment consists of a bipedal robot that can walk and run autonomously. In the following description, from the view point of the robot R, the fore and aft direction is defined as X-axis, the lateral direction as Y-axis, and the vertical direction as Z-axis. The robot R is provided with a head H, a pair of arms AL and AR, a torso B, and a pair of legs LL and LR. The head H is connected to the torso B which is the main part of the robot R via a neck joint N. One of the arms AL is connected to a left side of the torso B via a shoulder joint SL, and the other arm AR is connected to a right side of the torso B via a shoulder joint SR. One of the legs LL is connected to a lower left side of the torso B via a hip joint JL, and the other leg LR is connected to a lower right side of the torso B via a hip joint JR. A back pack carried on the back of the torso B consists of a control unit housing C containing a control unit for controlling the head H, the torso B, the arms AL and AR, and the legs LL and LR. As the robot R is symmetric with respect to a sagittal plane, only one of a pair of body parts may be described in the following description as the two body parts are mirror images of one another.

The leg LR includes an upper link L1 having an upper end connected to a lower right part of the torso B via the hip joint JR, and a lower link L2 having an upper end connected to the lower end of the upper link L1 via a knee joint KR. The lower end of the lower link L2 is connected via an ankle joint FR to a foot IR that contacts the ground surface.

The arm AR includes an upper link A1 having an upper end connected to an upper right part of the torso B via the shoulder joint SR, and a lower link A2 connected to the lower end of the upper link A1 via an elbow joint ER. The lower end of the lower link A2 is connected via a wrist joint WR to a gripper GR emulating a human hand for gripping things.

Figure 2:
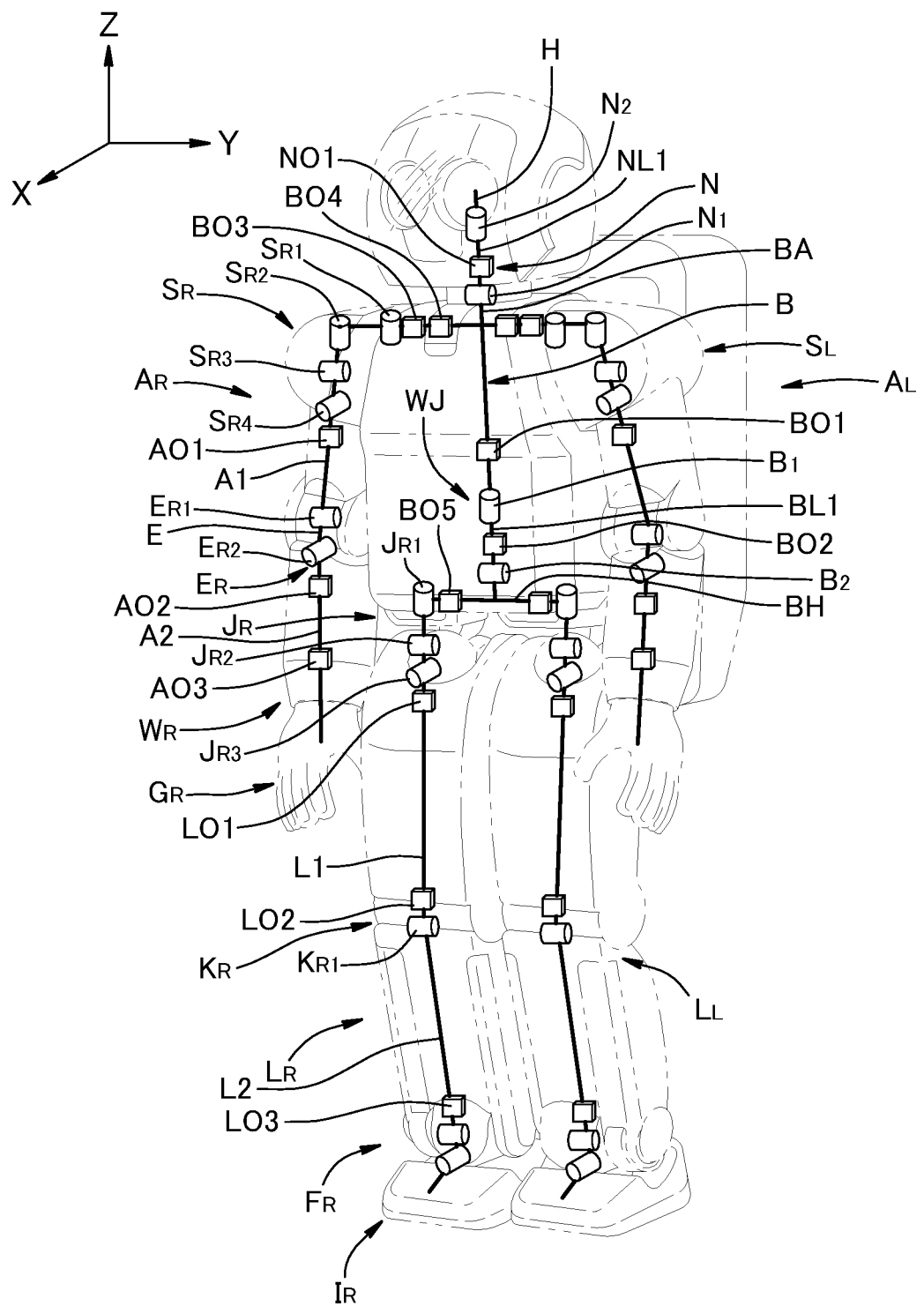
FIG. 2 is a schematic diagram illustrating the positioning of the links, couplings, and optical transceiver modules in the robot shown in FIG. 1.

As shown in FIG. 2, each joint of the robot R includes one or more couplings movably connecting the adjoining links with at least one degree of freedom. The movement permitted by each coupling between the adjoining links may include a roll movement around the X-axis, a pitch movement around the Y-axis, and a yaw movement around the Z-axis. As a special case, a coupling may permit a relative linear (telescopic) movement along an axial line between the adjoining links, or a twist movement around an axial line between the adjoining links. By combining such couplings, each joint may permit a relative movement of one or more degrees of freedom between the associated links. On the links constituting the robot R are provided controllers (see FIG. 3) to control actuators such as servomotors for actuating the joints to thereby control the attitude of the robot R. Each controller is connected with one or more optical transceiver modules for transmitting and receiving optical signals for use in the attitude control, and optical fiber cables connecting the optical transceiver modules are routed in the robot R. The optical fiber network including the optical transceiver modules and the optical fiber cables connecting them allows transmission of optical signals for controlling the attitude of the robot R.

The neck joint N is provided with a neck link NL1 and couplings N1 and N2 for connecting the head H with the torso B such that the head H is movable relative to the torso B. The neck link NL1 is connected to an upper end of the torso B via the coupling N1, which allows the neck link NL1 to pivot relative to the torso B around the Y-axis. The head H is connected to an upper end of the neck link NL1 via the coupling N2, such that the head H can pivot relative to the neck link NL1 around the Z-axis. An optical transceiver module NO1 is provided on the neck link NL1.

The torso B includes a torso link (torso main part) BA in an upper part thereof. The lower end of the torso link BA is connected to a hip link BH via a coupling B1, a waist link BL1, and a coupling B2, in this order from above. The couplings B1 and B2 and the waist link BL1 form a waist joint WJ allowing the torso link BA to pivot relative to the hip link BH about both the Z-axis and the Y-axis. Optical transceiver modules BO1 and BO2 are disposed on the torso link BA and the waist link BL1, respectively. The arms AR and AL are connected to right and left ends of an upper part of the torso link BA via the shoulder joints SR and SL, respectively. The shoulder joint SR includes four couplings SR1-SR4 and links connecting adjoining ones of the couplings SR1-SR4. The couplings SR1 and SR2 each allow the arm AR to pivot relative to the torso link BA around the Z-axis. The coupling SR3 allows pivoting of the arm AR around the Y-axis, and the coupling SR4 allows pivoting of the same around the X-axis. On a part of the torso link BA near the upper right end thereof are disposed optical transceiver modules BO3 and BO4 which transmit and receive optical signals for controlling the pivoting at the shoulder joint SR. On a part of the hip link BH near the right end thereof connected with the hip joint JR is disposed an optical transceiver module BO5 which transmits and receives optical signals for controlling the hip joint JR.

The leg LR includes the upper link L1 in its upper part. The upper end of the upper link L1, which also is the upper end of the leg LR, is connected to the right end of the hip link BH from below the hip link BH via the hip joint JR. The hip joint JR includes three couplings JR1-JR3 and links connecting adjoining ones of the couplings JR1-JR3. The couplings JR1, JR2, and JR3 allow the upper link L1 to pivot relative to the hip link BH around the Z-axis, Y-axis, and X-axis, respectively. The lower end of the upper link L1 is connected via the knee joint KR to the upper end of the lower link L2 constituting the lower part of the leg LR. The knee joint KR includes a single coupling KR1, which allows the lower link L2 to pivot relative to the upper link L1 around the Y-axis. The lower end of the lower link L2 is connected to the right foot IR via the ankle joint FR. The ankle joint FR includes two couplings which allow the right foot IR to pivot relative to the lower link L2 around the Y-axis and X-axis, respectively. On parts of the upper link L1 near the upper end and lower end thereof are disposed optical transceiver modules LO1 and LO2, respectively, and on a part of the lower link L2 near the lower end thereof is disposed an optical transceiver module LO3.

The arm AR includes the upper link A1 that has the upper end connected to the right end of the torso link BA via the shoulder joint SR. The lower end of the upper link A1 is connected to the upper end of the lower link A2 via the elbow joint ER. The elbow joint ER includes two couplings ER1, ER2 and a link connecting the couplings ER1 and ER2. The couplings ER1, ER2 allow the lower link A2 to pivot relative to the upper link A1 around the Y-axis and the X-axis, respectively. The lower end of the lower link A2 is connected to the gripper GR via the wrist joint WR. On a part of the upper link A1 near the upper end thereof is disposed an optical transceiver module AO1. On parts of the lower link A2 near the upper and lower ends thereof are provided optical transceiver modules AO2 and AO3, respectively.

The optical transceiver modules NO1, BO1, BO2, BO3, BO4, BO5, LO1, LO2, LO3, AO1, AO2, and AO3 each include an optical transmitter and an optical receiver. Each optical transmitter is connected to one end (input end) of an optical fiber cable, and inputs an optical signal to the optical fiber cable, where the optical signal has a power Pin (dBm) when input to the optical fiber cable. The input optical signal propagates through the optical fiber cable and reaches an optical receiver connected to the other end (terminal end) of the optical fiber cable. The optical receiver receives the optical signal transmitted from the optical transmitter through the optical fiber cable. The optical receiver is configured to be capable of signal-processing an optical signal having a prescribed power Pmin (dBm) or greater at the terminal end of the optical fiber cable.

In the illustrated embodiment, the optical signal transmitted from the optical transmitter is a digital signal having a value 0 (zero) or 1 (one), and in this description, an optical signal having a power Pin (dBm) when input to the optical fiber cable refers to an optical signal for transmitting the value of 1 (one).

It is to be noted that in this description, the optical power is represented by the unit "dBm," namely, represented by decibels (dB) where 1 mW is equal to 0 dB. Specifically, when the optical power is PW (mW), the optical power represented by the unit "dBm," PdB (dBm), can be expressed by a formula $PdB=10\times\log_{10} PW$. For example, when the optical power is 1 W ($1\times10^3$ (mW)), the optical power in dBm is 30 dBm.

In a case where the optical signal transmitted from the optical transmitter has a power Pin (dB) when input to the optical fiber cable and the optical receiver requires a minimum power Pmin (dB) of the optical signal to properly receive and process the optical signal, a maximum tolerable attenuation, which is a limit to the attenuation in the optical fiber cable to allow the optical signal transmitted from the optical transmitter to be successfully received and processed by the optical receiver, can be defined as a difference $\Delta P$ (dB) between the input power Pin and the required minimum power Pmin; namely, $\Delta P=Pin-Pmin$ (dB). The maximum tolerable attenuation is defined by the power Pin of the transmitted optical signal and the power Pmin of the received optical signal required for the received optical signal to be processed, and thus, defined by the specifications of the relevant optical transceiver modules (or optical transmitters and optical receivers contained therein). If the attenuation in the optical fiber cable between the optical transmitter and the optical receiver is not greater than the maximum tolerable attenuation, the optical signal transmitted frrm the optical transmitter is properly received and processed by the optical receiver, and if greater than the maximum tolerable attenuation, the power of the optical signal reaching the optical receiver becomes smaller than the power required for the optical receiver to receive and process the optical signal, and thus, the optical receiver cannot process the optical signal.

In this description, an optical attenuation is represented by an optical attenuation rate in decibels (dB). Namely, when a light having a power PW1 (mW) enters an attenuating member and exits from the attenuating member with a power PW2 (mW), an attenuation $\Lambda$ (dB) of the attenuating member is represented by a formula, $\Lambda=-10\times\log_{10}(PW2/PW1)=PdB1-PdB2$, where $PdB1=10\times\log_{10} PW1$, and $PdB2=10\times\log_{10} PW2$. Conversely, the power PW2 (mW) can be expressed using the attenuation $\Lambda$ (dB) by a formula, $PW2=PW1\times10^{-0.1\times\Lambda}$.

When an optical fiber cable is disposed to extend along links forming joints, the optical fiber cable is fixed to the links at fixing parts provided near the optical transmitter, optical receiver, and/or couplings. When the light propagating through the optical fiber cable passes through a part of the optical fiber cable corresponding to each fixing part, the light is attenuated by a prescribed attenuation, which is referred to in this description as a fixing part attenuation $\alpha f$ (dB). In a case where an optical fiber cable is disposed to extend across a coupling connecting links, the optical fiber cable undergoes bending at the coupling, and therefore, when the light propagating through the optical fiber cable passes through a part of the optical fiber cable corresponding to the coupling, the light is attenuated by a prescribed attenuation, which is referred to in this description as a coupling attenuation $\alpha l$ (dB). Also, two optical fiber cables may be connected by a connector, and the light passing through the connector is attenuated by a prescribed attenuation, which is referred to in this description as a connector attenuation $\alpha c$ (dB). Typically, each optical fiber cable used in the robot R is sufficiently short such that the attenuation relating to transmission through a part of the optical fiber cable other than the parts corresponding to the fixing part(s), coupling(s) and connector(s) is much smaller than the above-described fixing part attenuation $\alpha f$, coupling attenuation $\alpha l$, or connector attenuation $\alpha c$, and thus, may be negligible.

At each fixing part, the optical fiber cable may be bonded to the link by use of an adhesive, or the optical fiber cable may be tied to the link with a string such that the optical fiber cable is prevented from being separated from the link beyond a prescribed distance, for example.

When the links connected by the couplings are moved relative to each other to operate the robot R, the optical fiber cables undergo bending and stretching repeatedly at the parts where the couplings are provided, and each optical fiber cable suffers an amount of damage depending on the frequency of the bending and stretching. Because a greater damage to the optical fiber cable leads to a larger attenuation of the optical signal transmitted thereby, the coupling attenuation $\alpha l$ relating to each coupling increases as the links connected by the coupling are repeatedly moved. Thus, the coupling attenuation $\alpha l$ should be determined taking into account the frequency of movement of the links connected by the coupling and the amount of damage to the optical fiber cable which may change over time.

In the embodiments of the present invention, the fixing part attenuation $\alpha f$, coupling attenuation $\alpha l$, and connector attenuation αc are taken into account as factors determining an attenuation (transmission loss) in each optical fiber cable. Assuming, for the sake of simplicity, that the fixing part attenuation αf is the same for each fixing part, the coupling attenuation αl is the same for each coupling, and the connector attenuation αc is the same for each connector, the transmission loss in a given optical fiber cable can be expressed by the following formula (1):

$$(\text{transmission loss}) = n1 \cdot \alpha f + n2 \cdot \alpha l + n3 \cdot \alpha c \quad (1),$$

wherein n1 is the number of fixing parts associated with the optical fiber cable, n2 is the number of couplings associated with the optical fiber cable, and n3 is the number of connectors associated with the optical fiber cable.

To allow the optical transceiver modules connected by each optical fiber cable to properly perform optical communication, it is necessary that the transmission loss represented by the formula (1) is not greater than the maximum tolerable attenuation (ΔP=Pin−Pmin), which is determined by the specifications of the optical transceiver modules (more specifically, determined by the specifications of the optical transmitter in one of the optical transceiver modules and the optical receiver in the other); namely, each optical fiber cable is routed such that the condition expressed by the following inequality (2) is met:

$$(\text{maximum tolerable attenuation}) \geq n1 \cdot \alpha f + n2 \cdot \alpha l + n3 \cdot \alpha c \quad (2)$$

It is also possible to provide a safety factor S taking into account attenuation that may be caused by a part of the optical fiber cable other than the parts corresponding to the fixing parts, couplings and connectors, where the safety factor S is a value greater than zero, and to use the following inequality (3) as a condition that each optical fiber cable (and the optical transceiver modules connected thereby) should satisfy:

$$(\text{maximum tolerable attenuation}) \geq n1 \cdot \alpha f + n2 \cdot \alpha l + n3 \cdot \alpha c + S \quad (3)$$

Thus, by designing the optical fiber network constituted by the optical transceiver modules and the optical fiber cables such that the condition expressed by the above inequality (2) (or (3) if desired) is met for each optical fiber cable and the optical transceiver modules connected thereby, it is ensured that the optical signals used for controlling the attitude of the robot R are transmitted and received properly between the optical transceiver modules through the optical fiber cables.

<First Embodiment>

Figure 3:
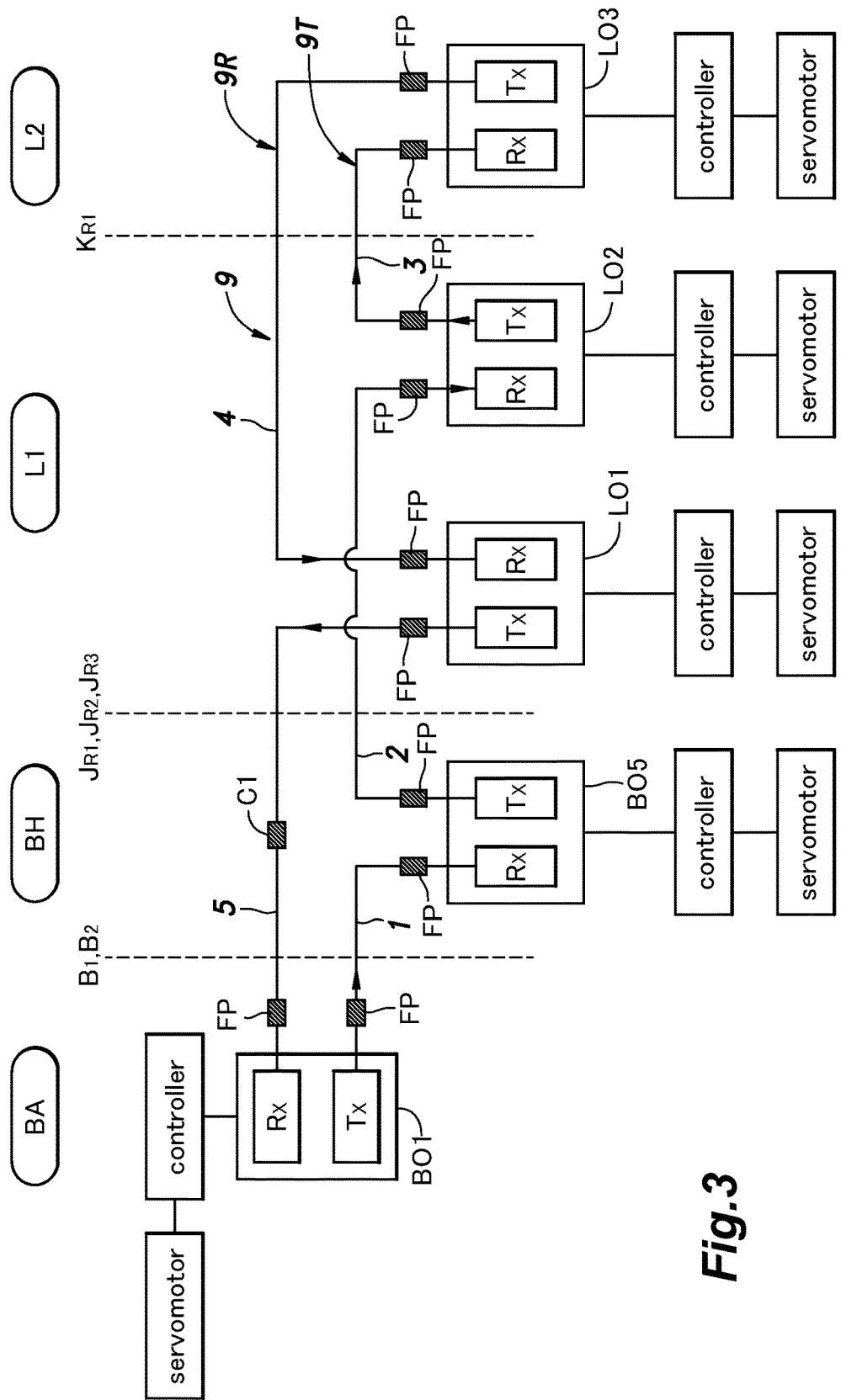
FIG. 3 is a schematic diagram showing an optical fiber network in the robot according to a first embodiment of the present invention.

FIG. 3 is a schematic diagram showing one of the optical fiber networks provided in the robot R according to a first embodiment. As shown in FIG. 3, an optical fiber network 9 includes the optical transceiver modules BO1, BO5, LO1, LO2, and LO3 and optical fiber cables 1, 2, 3, 4, and 5 connecting them. The optical transceiver module BO1 is provided on the torso link BA, and the torso link BA is connected, via the waist joint WJ including the couplings B1 and B2, to the hip link BH which is provided with the optical transceiver module BO5. The hip link BH provided with the optical transceiver module BO5 is connected, via the hip joint JR including the couplings JR1, JR2 and JR3, to the upper link L1 which is provided with the optical transceiver modules LO1 and LO2. The link L1 provided with the optical transceiver modules LO1 and LO2 is connected, via the knee joint KR including the coupling KR1, to the lower link L2 provided with the optical transceiver module LO3. The torso link BA, the hip link BH, the upper link L1, and the lower link L2 are connected in series in this order via the joints including the couplings B1, B2, JL1, JL2, JL3, and KR1, and the optical transceiver modules BO1, BO5, LO1, LO2, and LO3 are disposed on these links.

The torso link BA and the lower link L2 at either end of the assembly formed of the series-connected links BA, BH, L1, and L2 may be referred to as end links. The hip link BH and the upper link L1 disposed between the end links BA and L2 may be referred to as intermediate links.

To the optical transceiver modules BO1, BO5, LO1, LO2, LO3 are connected controllers that control the servomotors for actuating the joints based on the signals transmitted between the optical transceiver modules to thereby control the attitude or motion of the robot R.

It is to be noted that the optical transceiver module BO2 provided on the waist link BL1 of the waist joint WJ is not included in the optical fiber network 9 shown in FIG. 3, and is included in another optical fiber network established in the robot R.

The optical fiber cable 1 extends from the optical transmitter TX of the optical transceiver module BO1, passes through the fixing part FP provided near the optical transmitter TX of the optical transceiver module BO1, the two couplings B1 and B2, and the fixing part FP provided near the optical receiver RX of the transceiver module BO5, and is connected to the optical receiver RX of the optical transceiver module BO5. The optical fiber cable 2 extends from the optical transmitter TX of the optical transceiver module BO5, passes through the fixing part FP provided near the optical transceiver module BO5, the three couplings JR1, JR2, and JR3, and the fixing part FP provided near the optical transceiver module LO2, and is connected to the optical receiver RX of the optical transceiver module LO2. The optical fiber cable 3 extends from the optical transmitter TX of the optical transceiver module LO2, passes through the fixing part FP provided near the optical transceiver module LO2, the coupling KR1, and the fixing part FP provided near the optical transceiver module LO3, and is connected to the optical receiver RX of the optical transceiver module LO3. The optical fiber cable 4 extends from the optical transmitter TX of the optical transceiver module LO3, passes through the fixing part FP provided near the optical transmitter TX of the optical transceiver module LO3, the coupling KR1, and the fixing part FP provided near the optical transceiver module LO1, and is connected to the optical receiver RX of the optical transceiver module LO. The optical fiber cable 5 extends from the optical transmitter TX of the optical transceiver module LO1, passes through the fixing part FX provided near the optical transmitter TX of the optical transceiver module LO1, the couplings JR1, JR2, and JR3, and the connector C1 provided on the hip link BH, the couplings B1 and B2, and the fixing part FX provided near the optical receiver RX of the optical transceiver module BO1, and is connected to the optical receiver RX of the optical transceiver module BO1. Thus, the optical fiber cables 1 to 5 connect the optical transceiver module BO1 to the optical transceiver module BO5, the optical transceiver module BO5 to the optical transceiver module LO2, the optical transceiver module LO2 to the optical transceiver module LO3, the optical transceiver module LO3 to the optical transceiver module LO1, and the optical transceiver module LO1 to the optical transceiver module BO1, whereby the optical fiber network 9 having a ring topology is formed in the robot R.

In the above-configured optical fiber network 9, the optical fiber cables 1, 2, and 3 constitute a first optical fiber cable set 9T carrying the optical signals in a direction from the optical transceiver module BO1 provided on one end link (torso link) BA toward the optical transceiver module LO3 provided on the other end link L2, while the optical fiber cables 4 and 5 constitute a second optical fiber cable set 9R carrying the optical signals in a direction from the optical transceiver module LO3 provided on the other end link L2 toward the optical transceiver module BO1 provided on the one end link (torso link) BA.

The optical fiber network 9 does not include an optical fiber cable that directly connects the optical transceiver modules BO1 and LO3 which are provided on the respective end links BA and L2. In other words, at least one end of each of the optical fiber cables 1 to 5, which connect the optical transceiver modules provided on different links, is connected to one of the optical transceiver modules (BO5, LO1 and LO2 in the illustrated embodiment) provided on the intermediate links (BH and L1, in the illustrated embodiment). As a result, in the optical fiber network shown in FIG. 3, though there are three joints WJ, JR, KR for series-connecting the four links BA, BH, L1, and L2, on which the optical transceiver modules BO1, BO5, LO1, LO2, and LO3 constituting the optical fiber network 9 are provided, each optical fiber cable 1 to 5 passes through less than three joints. Namely, none of the optical fiber cables 1 to 5 passes through the all three joints connecting the links BA, BH, L1, and L2 on which the optical transceiver modules BO1, BO5, LO1, LO2, and LO3 constituting the optical fiber network 9 are provided.

In the optical fiber network 9, when the optical transmitter TX of the optical transceiver module BO1 outputs an optical signal having a power Pin, the optical signal propagates through the optical fiber cable 1 and is received by the optical receiver RX of the transceiver module BO5. The optical transceiver module BO5 that received the optical signal amplifies the optical signal and outputs the optical signal with the power Pin from the optical transmitter TX thereof. The optical signal then propagates through the optical fiber cable 2 and is received by the optical receiver RX of the optical transceiver module LO2. The optical transceiver module LO2 that received the optical signal amplifies the optical signal and outputs the optical signal with the power Pin from the optical transmitter TX thereof. The optical signal then propagates through the optical fiber cable 3 and is received by the optical receiver RX of the optical transceiver module LO3. The optical transceiver module LO3 that received the optical signal amplifies the optical signal and outputs the optical signal with the power Pin from the optical transmitter TX thereof. The optical signal then propagates through the optical fiber cable 4 and is received by the optical receiver RX of the optical transceiver module LO1. The optical transceiver module LO1 that received the optical signal amplifies the optical signal and outputs the optical signal with the power Pin from the optical transmitter TX thereof. The optical signal then propagates through the optical fiber cable 5 and is received by the optical receiver RX of the optical transceiver module BO1, which discards the optical signal. Thus, in the optical fiber network 9, the optical signal output from the optical transceiver module BO1 is relayed by the optical transceiver modules BO5, LO2, LO3, and LO1 in this order to circulate through the optical fiber network 9 until it returns to the optical transceiver module BO1; namely, the optical signal is transmitted from one optical transceiver module to another in one direction.

In the optical fiber network 9, an optical transceiver module having an optical signal to be sent to another optical transceiver module outputs the optical signal with information of the destination optical transceiver module. The optical signal output from the optical transceiver module propagates through the optical fiber network 9 by being relayed from one optical transceiver module to another, as described above, and when the optical signal is received by the destination optical transceiver module, the destination optical transceiver module processes the optical signal.

In this optical fiber network 9, because the optical signal circulates in one direction, collision of the optical signals is prevented, and a malfunction of the robot R caused by the data collision can be avoided. In a case where a token passing communication, in which an optical signal called a token travels around the ring network such that only the optical transceiver module having the token can transmit data, is adopted, the data collision can be prevented and a malfunction caused by the data collision can be avoided even more effectively.

Figure 4:
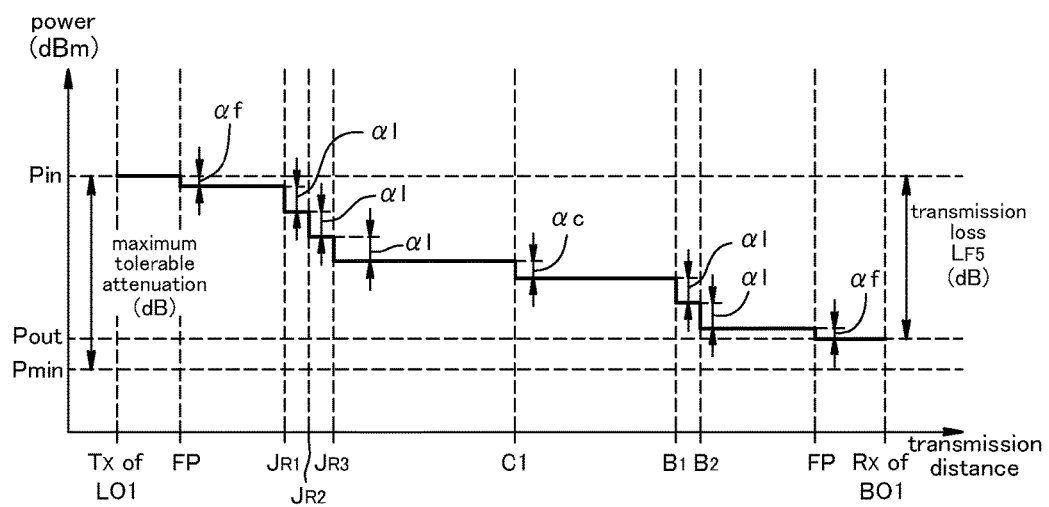
FIG. 4 is a graph showing an optical signal power at various points in one of the optical fiber cables shown in FIG. 3 that has the largest transmission loss.

FIG. 4 is a graph showing an optical signal power at various points in one of the optical fiber cables shown in FIG. 3 that has the largest transmission loss. Specifically, FIG. 4 shows the optical signal power at various points in the optical fiber cable 5 connecting the optical transmitter TX of the optical transceiver module LO1 with the optical receiver RX of the optical transceiver module BO1. As shown in FIG. 4, the optical signal output from the optical transmitter TX of the optical transceiver module LO1 to the optical fiber cable 5 has a power Pin (dBm). The optical signal output from the optical transmitter TX of the optical transceiver module LO1 propagates through the optical fiber cable 5 and passes through the fixing part FX near the optical transceiver module LO1. When passing through the fixing part FX, the power of the optical signal is attenuated by the fixing part attenuation $\alpha f$ (dB). The optical signal having passed the fixing part FX propagates through the optical fiber cable 5 and passes through the couplings JR1, JR2, and JR3. When passing through each coupling JR1, JR2, and JR3, the power of the optical signal is attenuated by the coupling attenuation $\alpha l$ (dB). The optical signal having passed through the couplings JR1, JR2, and JR3 propagates through the optical fiber cable 5 and passes through the connector C1 provided in the hip link BH, at which the optical signal is attenuated by the connector attenuation $\alpha c$ (dB). The optical signal having passed through the connector C1 propagates through the optical fiber cable 5 and passes through the couplings B1 and B2, and is attenuated by the coupling attenuation $\alpha l$ (dB) when passing through each coupling B1 and B2. The optical signal having passed through the couplings B1 and B2 further passes through the fixing part FX near the optical transceiver module B01, and is attenuated by the fixing part attenuation $\alpha f$ (dB) when passing through the fixing part FP. Thereafter, the optical signal reaches the end of the optical fiber cable 5 and is received by the optical receiver RX of the optical transceiver module B01. Thus, in accordance with the above-mentioned formula (1), the transmission loss L5 (dB) in the optical fiber cable 5 can be expressed as follows:

$$L5 = 5\alpha l + 2\alpha f + \alpha c$$

Also, the power Pout (dB) of the optical signal received by the optical receiver RX of the optical transceiver module B01 is expressed by the following formula (4).

$$Pout = Pin - (5\alpha l + 2\alpha f + \alpha c) \quad (4)$$

In order for the optical signal transmitted from the optical transmitter TX of the optical transceiver module LO1 to be received and processed by the optical receiver RX of the optical transceiver module BO1 (namely, in order for the optical signal transmitted from the optical transceiver module LO1 through the optical fiber cable 5 to have a sufficient power to be received and processed by the optical receiver RX of the optical transceiver module BO1), it is necessary that the transmission loss is not greater than the maximum tolerable attenuation ΔP (=Pin−Pmin) (dB) determined by the specifications of the transceiver modules BO1 and LO1; namely, the optical fiber cable 5 needs to meet the condition expressed by the following inequality (5):

$$\Delta P \geq 5\alpha l + 2\alpha f + \alpha c \qquad (5)$$

When the inequality (5) is met, the power Pout (dBm) of the optical signal received by the optical receiver RX of the optical transceiver module BO1 is equal to or greater than the required minimum power Pmin (dBm).

The optical fiber cable 1 passes through two fixing parts FP and two couplings B1 and B2, and therefore, the transmission loss therein is expressed as 2αl+2αf (dB). The optical fiber cable 2 passes through two fixing parts FP and three couplings JR1, JR2, and JR3, and therefore, the transmission loss therein is expressed as 3αl+2αf (dB). The optical fiber cable 3 passes through two fixing parts FP and one coupling KR1, and therefore, the transmission loss therein is expressed as αl+2αf (dB). The optical fiber cable 4 passes through two fixing parts FP and one coupling KR1, and therefore, the transmission loss therein is expressed as αl+2αf (dB). Thus, each of the transmission losses in the optical fiber cables 1 to 4 is smaller than the transmission loss in the optical fiber cable 5, which is 5αl+2αf+αc (dB). Therefore, assuming that the optical transceiver modules BO1, BO5, LO1, LO2, and LO3 all have the same specifications and the maximum tolerable attenuation ΔP (=Pin−Pmin) is the same for each of the optical fiber cables 1 to 5, if the inequality (5) is met, the transmission loss in each of the optical fiber cables 1, 2, 3, and 4 also is smaller than the maximum tolerable attenuation ΔP; namely, it is ensured that the optical signal can be transmitted from one optical transceiver module (more specifically, the optical transmitter contained therein) to another optical transceiver module (more specifically, the optical receiver contained therein) through any of the optical fiber cables 1 to 5, without attenuation of the optical signal to such an extent that the power of the received optical signal goes below the power required for signal processing.

Figure 5:
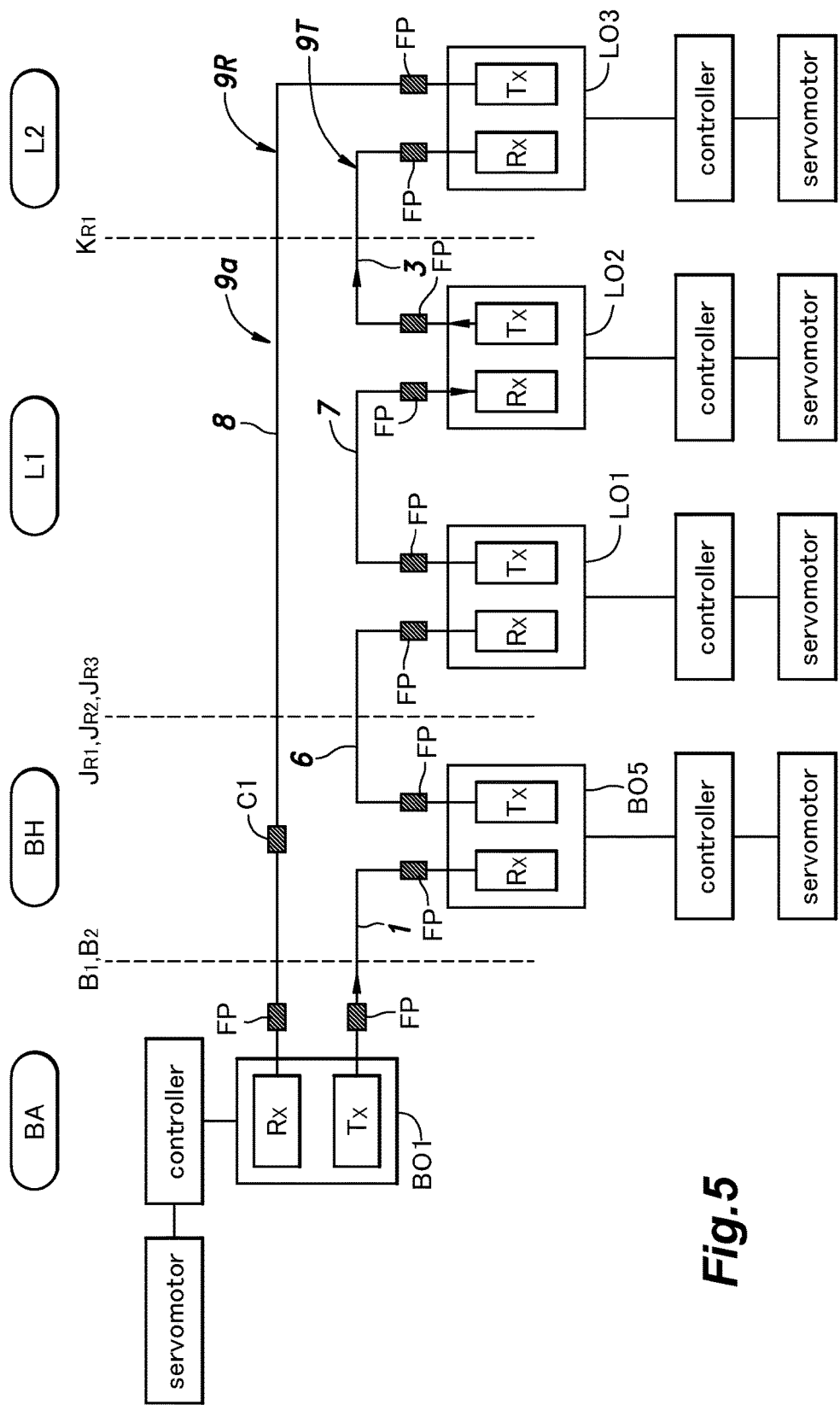
FIG. 5 is a schematic diagram showing a connection of an optical fiber network of a comparative example.

FIG. 5 is a schematic diagram showing a comparative example of an optical fiber network. In FIG. 5, component parts same as those shown in FIG. 3 are denoted by the same reference signs and the detailed description thereof may be omitted.

Like the optical fiber network 9 shown in FIG. 3, the optical fiber network 9a shown in FIG. 5 includes the optical transceiver modules BO1, BO5, LO1, LO2, and LO3. The optical fiber network 9a is different from the optical fiber network 9 in that in the optical fiber network 9a, the optical transmitter TX of the optical transceiver module BO5 is connected via an optical fiber cable 6 to the optical receiver RX of the optical transceiver module LO1, the optical transmitter TX of the optical transceiver module LO1 is connected via an optical fiber cable 7 to the optical receiver RX of the optical transceiver module LO2, and the optical transmitter TX of the optical transceiver module LO3 is connected via an optical fiber cable 8 to the optical receiver RX of the optical transceiver module BO1.

As a result, the optical fiber cable 8 connecting the optical transceiver modules BO1 and LO3, which are provided on the end links BA and L2, passes through the all three joints WJ, JR, and KR connecting the links BA, BH, L1, and L2, and hence passes through the all six couplings B1, B2, JR1, JR2, JR3, and KR1 included in these joints in addition to the connector C1 and the two fixing parts FP. Thus, the transmission loss in the optical fiber cable 8 in the optical fiber network 9a is expressed as 6αl+2αf+αc (dB).

In contrast, the optical fiber network 9 shown in FIG. 3 does not include an optical fiber cable that directly connects the optical transceiver modules BO1 and LO3, and none of the optical fiber cables 1 to 5 passes through the all three joints connecting the links BA, BH, L1, and L2 on which the optical transceiver modules BO1, BO5, LO1, LO2, and LO3 constituting the optical fiber network 9 are provided. As a result, the largest of the transmission losses in the optical fiber cables 1 to 5, is the transmission loss in the optical fiber cable 5, which is 5αl+2αf+αc, and this is smaller than the transmission loss in the optical fiber cable 8 in the optical fiber network 9a. Thus, in the optical fiber network 9 shown in FIG. 3, the transmission loss is reduced compared to that in the optical fiber network 9a. This makes it possible to use an optical transceiver module including an optical transmitter with a smaller power and/or an optical transceiver module including an optical receiver with a lower sensitivity.

<Second Embodiment>

Figure 6:
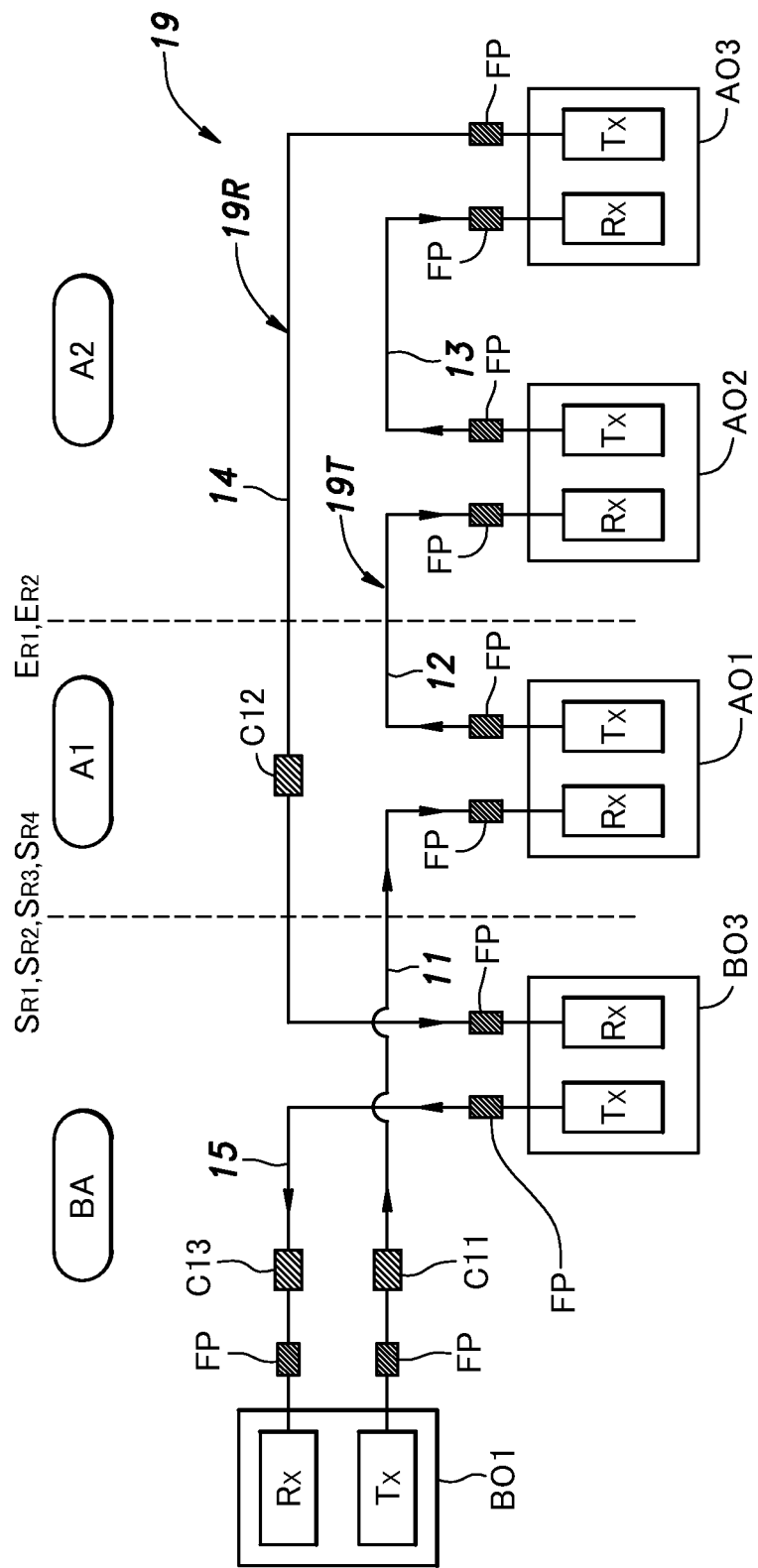
FIG. 6 is a schematic diagram showing a connection of an optical fiber network according to a second embodiment.

As shown in FIG. 6, an optical fiber network 19 provided in the robot R according to a second embodiment includes the optical transceiver modules BO1, BO3, AO1, AO2, and AO3, and optical fiber cables 11 to 15 connecting them. In this drawing, the controllers and servomotors are omitted. The optical transceiver modules BO1 and BO3 are provided on the torso link BA, which is connected, via the couplings SR1, SR2, SR3, and SR4 of the shoulder joint SR, to the upper link A1 which is provided with the optical transceiver module AO1. The upper link A1 is connected, via the couplings ER1 and ER2 of the elbow joint ER, to the lower link A2 which is provided with the optical transceiver modules AO2 and AO3. The torso link BA, the upper link A1, and the lower link A2 are connected in series via the joints SR and ER including the couplings SR1, SR2, SR3, SR4, ER1, and ER2, and the optical transceiver modules BO1, BO3, AO1, AO2, and AO3 are provided on these links.

The optical fiber cable 11 connects the optical transmitter TX of the optical transceiver module BO1 with the optical receiver RX of the optical transceiver module AO1, and on the way from the module BO1 to AO1, passes through two fixing parts FP respectively provided near the optical transceiver modules BO1 and AO1, a connector C11 provided in the torso link BA, and the couplings SR1, SR2, SR3, and SR4. The optical fiber cable 12 connects the optical transmitter TX of the optical transceiver module AO1 with the optical receiver RX of the optical transceiver module AO2, and on the way from the module AO1 to AO2, passes through two fixing parts FP respectively provided near the optical transceiver modules AO1 and AO2 and the couplings ER1 and ER2. The optical fiber cable 13 connects the optical transmitter TX of the optical transceiver module AO2 with the optical receiver RX of the optical transceiver module AO3, and on the way from the module AO2 to AO3, passes through two fixing parts FP respectively provided near the optical transceiver modules AO2 and AO3. The optical fiber cable 14 connects the optical transmitter TX of the optical transceiver module AO3 with the optical receiver RX of the optical transceiver module BO3, and on the way from the module AO3 to BO3, passes through two fixing parts FP respectively provided near the optical transceiver modules AO3 and BO3, the couplings ER1, ER2, SR1, SR2, SR3 and SR4 of the elbow joint ER and the shoulder joint SR, and a connector C12 provided in the upper link A1. The optical fiber cable 15 connects the optical transmitter TX of the optical transceiver module BO3 with the optical receiver RX of the optical transceiver module BO1, and on the way from the module BO3 to BO1, passes through two fixing parts FP respectively provided near the optical transceiver modules BO3 and BO1 and a connector C13 provided in the torso link BA.

Thus, the optical transceiver modules BO1, BO3, AO1, AO2, and AO3 are connected by the optical fiber cables 11 to 15 to form the optical fiber network 19 having a ring topology.

In the optical fiber network 19, the optical fiber cables 11, 12, and 13 constitute a first optical fiber cable set 19T carrying the optical signals in a direction from the optical transceiver module BO1 on one end link (torso link) BA toward the optical transceiver module AO3 on the other end link (lower link) A2, while the optical fiber cables 14 and 15 constitute a second optical fiber cable set 19R carrying the optical signals in a direction from the optical transceiver module AO3 on the other end link (lower link) A2 toward the optical transceiver module BO1 on the one end link (torso link) BA.

The optical fiber cable 11 passes through the two fixing parts FP, the four couplings SR1, SR2, SR3 and SR4, and the single connector C11, and accordingly, the transmission loss thereof is expressed as $4\alpha l+2\alpha f+\alpha c$ (dB). The optical fiber cable 12 passes through the two fixing parts FP and the two couplings ER1 and ER2, and accordingly, the transmission loss thereof is expressed as $2\alpha l+2\alpha f$ (dB). The optical fiber cable 13 passes through the two fixing parts FP, and accordingly, the transmission loss thereof is expressed as $2\alpha f$. The optical fiber cable 14 passes through the two fixing parts FP, the six couplings ER1, ER2, SR1, SR2, SR3, and SR4, and the single connector C12, and accordingly, the transmission loss thereof is expressed as $6\alpha l+2\alpha f+\alpha c$ (dB). The optical fiber cable 15 passes through the two fixing parts FP and the single connector C13, and accordingly, the transmission loss there of is expressed as $2\alpha f+\alpha c$ (dB). Of the optical fiber cables 11-15, the optical fiber cable 14 has the largest transmission loss, which is $6\alpha l+2\alpha f+\alpha c$ (dB).

In the optical fiber network 19, configuration is made such that an optical signal transmitted from the optical transceiver module AO3 and propagating through the optical fiber cable 14 can be received and processed by the optical receiver RX of the optical transceiver module BO3. In other words, configuration is made such that the transmission loss in the optical fiber cable 14 and the maximum tolerable attenuation $\Delta P$ (=Pin−Pmin) (dB) determined by the transceiver modules AO3 and BO3 satisfy the above inequality (2). Namely, the following inequality (6) is met:

$$\Delta P \geq 6\alpha l+2\alpha f+\alpha c \qquad (6)$$

When the inequality (6) is met, the transmission loss in each of the other optical fiber cables 11, 12, 13, and 15 in the optical fiber network 19 also is smaller than or equal to the maximum tolerable attenuation.

In an operation of the optical fiber network 19, as shown in FIG. 6, an optical signal transmitted from the optical transceiver module BO1 is relayed by the optical transceiver modules AO1, AO2, AO3, and BO3 in this order and returns to the optical transceiver module BO1, and thus, the optical signal circulates through the optical fiber network 19 in one direction.

In the optical fiber network 19 for the robot R configured as above, the largest of the transmission losses in the optical fiber cables 11 to 15, namely, the transmission loss in the optical fiber cable 14, which is $6\alpha l+2\alpha f+\alpha c$ (dB), satisfies the inequality (2). In other word, the transmission loss in the optical fiber cable 14 is not greater than the maximum tolerable attenuation $\Delta P$ (=Pin−Pmin) (dB) determined by the optical transceiver modules connected by the optical fiber cable 14. The transmission loss in each of the other optical fiber cables 11, 12, 13, and 15 is smaller than the transmission loss in the optical fiber cable 14, and hence, also satisfies the inequality (2) or is smaller than or equal to the maximum tolerable attenuation $\Delta P$ (=Pin−Pmin) (dB) determined by the optical transceiver modules connected by the optical fiber cable. Thus, it is ensured that the transmission loss in each of the optical fiber cables 11 to 15 is not greater than the maximum tolerable attenuation, and therefore, the optical fiber network 19 for the robot R is provided in which the optical transceiver modules (optical transmitters and optical receivers) provided on different links are communicably connected by the optical fiber cables.

<Third Embodiment>

Figure 7:
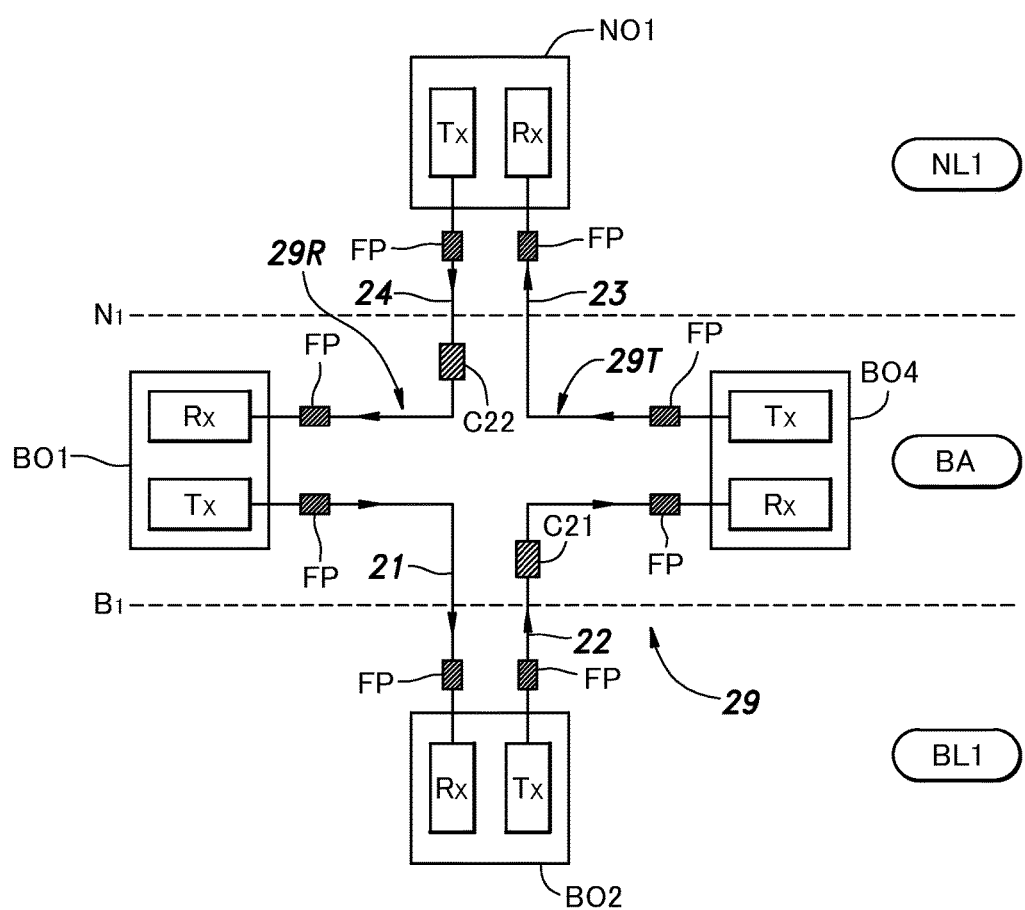
FIG. 7 is a schematic diagram showing a connection of an optical fiber network according to a third embodiment.

As shown in FIG. 7, an optical fiber network 29 provided in the robot R according to a third embodiment includes the optical transceiver modules BO1, BO2, BO4, and NO1, and optical fiber cables 21 to 24 connecting them. In this drawing, the controllers and servomotors are omitted. The optical transceiver modules BO1 and BO4 are provided on the torso link BA, which is connected, via the coupling B1 of the waist joint WJ, to the waist link BL1 provided with the optical transceiver module BO2. The torso link BA is also connected, via the coupling N1 of the neck joint N, to the neck link NL1 provided with the optical transceiver module NO1. Thus, the waist link BL1, the torso link BA and the neck link NL1 are connected in series in this order.

The optical fiber cables 21 to 24 connect the optical transceiver modules BO1, BO2, BO4, and NO1 in a ring. The optical fiber cable 21 connects the optical transmitter TX of the optical transceiver module BO1 with the optical receiver RX of the optical transceiver module BO2, and on the way from the module BO1 to BO2, passes through two fixing parts FP respectively provided near the optical transceiver modules BO1 and BO2 and the coupling B1. The optical fiber cable 22 connects the optical transmitter TX of the optical transceiver module BO2 with the optical receiver RX of the optical transceiver module BO4, and on the way from the module BO2 to BO4, passes through two fixing parts FP respectively provided near the optical transceiver modules BO2 and BO4, the coupling B1, and a connector C21 provided in the torso link BA. The optical fiber cable 23 connects the optical transmitter TX of the optical transceiver module BO4 with the optical receiver of the optical transceiver module NO1, and on the way from the module BO4 to NO1, passes through two fixing parts FP respectively provided near the optical transceiver modules BO4 and NO1 and the coupling N1. The optical fiber cable 24 connects the optical transmitter TX of the optical transceiver module NO1 with the optical receiver RX of the optical transceiver module BO1, and on the way from the module NO1 to BO1, passes through two fixing parts FP respectively provided near the optical transceiver modules NO1 and BO1, the coupling N1, and a connector C22 provided in the torso link BA.

In the optical fiber network 29, the optical fiber cables 22 and 23 constitute a first optical fiber cable set 29T carrying the optical signals in a direction from the optical transceiver module BO2 on one end link (waist link) BL1 toward the optical transceiver module NO1 on the other end link (neck link) NL1, while the optical fiber cables 24 and 21 constitute a second optical fiber cable set 29R carrying the optical signals in a direction from the optical transceiver module NO1 on the other end link (neck link) NL1 toward the optical transceiver module BO2 on the one end link (waist link) BL1.

As the optical fiber cable 22 passes through the two fixing parts FP, the single coupling B1, and the single connector C21, the transmission loss in the optical fiber cable 22 is expressed as $\alpha l+2\alpha f+\alpha c$ (dB) in accordance with the above-mentioned formula (1). Similarly, the transmission losses in the optical fiber cables 21, 23, and 24 are expressed as $\alpha l+2\alpha f$ (dB), $\alpha l+2\alpha f$ (dB), and $\alpha l+2\alpha f+\alpha c$ (dB), respectively.

In the optical fiber network 29, configuration is made such that an optical signal transmitted from the optical transceiver module BO2 can be received and processed by the optical receiver RX of the optical transceiver module BO4. In other words, configuration is made such that the transmission loss in the optical fiber cable 22 and the maximum tolerable attenuation ΔP (=Pin−Pmin) (dB) determined by the transceiver module BO2 and BO4 satisfy the above inequality (2). Namely, the following inequality (7) is met:

$$\Delta P \geq \alpha l+2\alpha f+\alpha c \qquad (7)$$

When the inequality (7) is met, the transmission loss in each of the other optical fiber cables 21, 23, and 24 in the optical fiber network 29 also is smaller than or equal to the maximum tolerable attenuation.

In an operation of the optical fiber network 29, as shown in FIG. 7, an optical signal transmitted from the optical transceiver module BO1 is relayed by the optical transceiver modules BO2, BO4, and NO1 in this order and returns to the optical transceiver module BO1, and thus, the optical signal circulates through the optical fiber network 29 in one direction.

In the optical fiber network 29 for the robot R configured as above, the largest of the transmission losses in the optical fiber cables 21-24, namely, the transmission loss in the optical fiber cable 22, which is $\alpha l+2\alpha f+\alpha c$ (dB), satisfies the inequality (2). In other words, the transmission loss in the optical fiber cable 22 is not greater than the maximum tolerable attenuation ΔP (=Pin−Pmin) (dB) determined by the optical transceiver modules connected by the optical fiber cable 22. The transmission loss in each of the optical fiber cables 21, 23, and 24 is smaller than the transmission loss in the optical fiber cable 22, and hence, also satisfies the inequality (2) or is smaller than or equal to the maximum tolerable attenuation ΔP (dB) determined by the optical transceiver module connected by the optical fiber cable. Thus, it is ensured that the transmission loss in each of the optical fiber cables 21 to 24 is not greater than the maximum tolerable attenuation, and therefore, the optical fiber network 29 for the robot R is provided in which the optical transceiver modules (optical transmitters and optical receivers) provided on different links are communicably connected by the optical fiber cables.

The optical fiber network 29 includes only one intermediate link (torso link) BA, which is provided with the two optical transceiver modules BO1 and BO4, and there is no intermediate link provided with a single optical transceiver module. The optical transmitter TX of the optical transceiver module BO2 on the waist link BL1, which is one end link, is connected with the optical receiver RX of one of the two optical transceiver modules BO4 on the torso link (intermediate link) BA by the optical fiber cable 22, while the optical receiver RX of the optical transceiver module BO2 on the waist link (one end link) BL1 is connected with the optical transmitter TX of the other optical transceiver module BO1 on the torso link BA by the optical fiber cable 21. The optical transmitter TX of the optical transceiver module NO1 on the neck link (other end link) NL1 is connected with the optical receiver RX of the other optical transceiver module BO1 on the torso link BA by the optical fiber cable 24, while the optical receiver RX of the optical transceiver module NO1 is connected with the optical transmitter TX of the one optical transceiver module BO4 on the torso link BA by the optical fiber cable 23. Thereby, the number of joints passed by each of the optical fiber cables 21 to 24 in the optical fiber network 29 is minimized.

<Fourth Embodiment>

Figure 8:
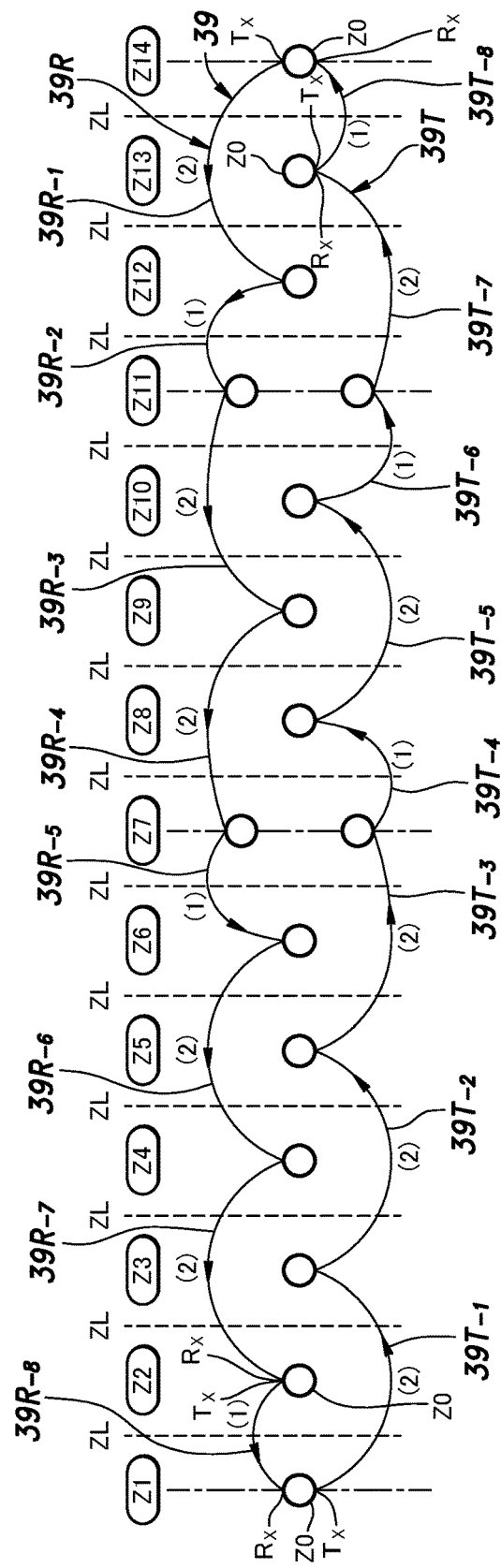
FIG. 8 is a schematic diagram showing a connection of an optical fiber network according to a fourth embodiment.

The optical fiber network 9 shown in FIG. 3 contains four links BA, BH, L1, and L2 on which the optical transceiver modules BO1, BO5, LO1, LO2, and LO3 constituting the optical fiber network 9 are provided. However, the present invention is not limited to such a configuration, and the optical fiber network may include optical transceiver modules provided on more than four links connected in series via a corresponding number of joints. FIG. 8 is a schematic diagram showing an example of such an optical fiber network.

An optical fiber network 39 shown in FIG. 8 includes fourteen links Z1-Z14 connected in series in this order such that adjoining links are connected by a joint ZL which includes one or more couplings. Two optical transceiver modules Z0 are provided on each of a link Z7 and a link Z11, and a single optical transceiver module Z0 is provided on each of the other links Z1-Z6, Z8-Z10, and Z12-Z14. In this drawing, the controllers and servomotors are omitted.

In the assembly of the series-connected links, the link Z1 is located on one end and the link Z14 is located on the other end, and thus, the links Z1 and Z14 are end links. The other links Z2-Z13 provided between the end links Z1 and Z14 are intermediate links.

From the optical transmitter TX of the optical transceiver module ZO on the link Z1 to the optical receiver RX of the optical transceiver module ZO on the link Z14 are provided an optical fiber cable 39T-1 connecting the optical transceiver modules ZO on the links Z1 and Z3, an optical fiber cable 39T-2 connecting the optical transceiver modules ZO on the links Z3 and Z5, an optical fiber cable 39T-3 connecting the optical transceiver modules ZO on the links Z5 and Z7, an optical fiber cable 39T-4 connecting the optical transceiver modules ZO on the links Z7 and Z8, an optical fiber cable 39T-5 connecting the optical transceiver modules ZO on the links Z8 and Z10, an optical fiber cable 39T-6 connecting the optical transceiver modules ZO on the links Z10 and Z11, an optical fiber cable 39T-7 connecting the optical transceiver modules ZO on the links Z11 and Z13, and an optical fiber cable 39T-8 connecting the optical transceiver modules ZO on the links Z13 and Z14. From the optical transmitter TX of the optical transceiver module ZO on the link Z14 to the optical receiver RX of the optical transceiver module on the link Z1 are provided optical fiber cable 39R-1 connecting the optical transceiver modules ZO on the links Z14 and Z12, an optical fiber cable 39R-2 connecting the optical transceiver modules ZO on the links Z12 and Z11, an optical fiber cable 39R-3 connecting the optical transceiver modules ZO on the links Z11 and Z9, an optical fiber cable 39R-4 connecting the optical transceiver modules ZO on the links Z9 and Z7, an optical fiber cable 39R-5 connecting the optical transceiver modules ZO on the links Z7 and Z6, an optical fiber cable 39R-6 connecting the optical transceiver modules ZO on the links Z6 and Z4, an optical fiber cable 39R-7 connecting the optical transceiver modules Z0 on the links Z4 and Z2, and an optical fiber cable 39R-8 connecting the optical transceiver modules ZO on the links Z2 and Z1.

The optical fiber cables 39T-1 to 39T-8 constitute a first optical fiber cable set 39T carrying the optical signals in a direction from the optical transceiver module Z0 on one end link Z1 toward the optical transceiver module ZO on the other end link Z14 without reversing (namely, each of the optical fiber cables 39T-1 to 39T-8 included in the first optical fiber cable set 39T carries optical signals from the optical transceiver module ZO on one link to the optical transceiver module ZO on another link that is located closer to the other end link Z14 than the one link), while the optical fiber cables 39R-1 to 39R-8 constitute a second optical fiber cable set 39R carrying the optical signals in a direction from the optical transceiver module Z0 on the other end link Z14 toward the optical transceiver module Z0 on the one end link Z1 without reversing (namely, each of the optical fiber cables 39R-1 to 39R-8 included in the second optical fiber cable set 39R carries optical signals from the optical transceiver module ZO on one link to the optical transceiver module ZO on another link that is located closer to the one end link Z1 than the one link). In the optical fiber network 39, the optical transceiver modules ZO provided on the series-connected links Z1 to Z14 are connected by the optical fiber cables 39T-1 to 39T-8 and 39R-1 to 39R-8 to form a ring.

In this embodiment, each of the two optical transceiver modules Z0 provided on the intermediate link Z7 is connected with the optical transceiver modules Z0 provided on other intermediate links (one being connected on the optical transceiver modules Z0 on the links Z6 and Z9, while the other being connected on the optical transceiver modules Z0 on the links Z5 and Z8), and the two optical transceiver modules Z0 provided on the intermediate link Z7 are not connected with each other. Similarly, each of the two optical transceiver modules Z0 provided on the intermediate link Z11 is connected with the optical transceiver modules Z0 provided on other intermediate links (one being connected on the optical transceiver modules Z0 on the links Z9 and Z12, while the other being connected on the optical transceiver modules Z0 on the links Z10 and Z13), and the two optical transceiver modules Z0 provided on the intermediate link Z11 are not connected with each other.

An optical fiber cable connecting the optical transceiver modules provided on different links passes through one or more joints, and hence passes through the coupling(s) included in the joint(s). The more couplings the optical fiber cable passes through, the larger the attenuation of the optical signal propagating through the optical fiber cable becomes. In the optical fiber network 39 shown in FIG. 8, because the optical fiber network 39 is formed as a ring network including the first optical fiber cable set 39T carrying the optical signals in the direction from the optical transceiver module Z0 on the one end link Z1 toward the optical transceiver module ZO on the other end link Z14 without reversing, and the second optical fiber cable set 39R carrying the optical signals in the direction from the optical transceiver module Z0 on the other end link Z14 toward the optical transceiver module Z0 on the one end link Z1 without reversing, only two optical fiber cables (one included in the first optical fiber cable set 39T, the other included in the second optical fiber cable set 39R) pass through each of the joints ZL.

When optical transceiver modules ZO provided on adjacent links (such as the links Z1 and Z2) connected with each other via one joint ZL are connected by an optical fiber cable, the optical fiber cable passes through the one joint ZL.

With regard to an intermediate link provided with a single optical transceiver module Z0 (such as the links Z2-Z6 and Z9, Z10, Z12, and Z13), the optical fiber cables connecting the single optical transceiver module Z0 with optical transceiver modules Z0 on other links are included in one of the first and second optical fiber cable sets 39T and 39R, and the optical fiber cable passing through the intermediate link without being connected with the single optical transceiver module Z0 thereon is included in the other of the first and second optical fiber cable sets 39T and 39R. (For example, the optical fibber cables 39R-8 and 39R-7 connecting the intermediate link Z2 to the links Z1 and Z4, respectively, are included in the second optical fiber cable set 39R, while the optical fiber cable 39T-1 passing through the link Z2 without being connected with the optical transceiver module Z0 on the link Z2 is included in the first optical fiber cable set 39T.) When an optical fiber cable connects the optical transceiver modules Z0 provided on a pair of links that are connected on either end of another link therebetween via respective joints, the number of joints that the optical fiber cable passes through is two.

In the optical fiber network 39, the optical transceiver modules Z0 are connected in the ring by the optical fiber cables 39T-1 to 39T-8 and 39R-1 to 39R-8 each passing through one or two (namely, less than three) joints ZL.

In a case where an even number of intermediate links each provided with a single optical transceiver module are connected in series between the two end links (such as the links Z1 and Z14 in FIG. 8), between one end link and an intermediate link provided with two optical transceiver modules (such as the end link Z1 and the intermediate link Z7 in FIG. 8), or between two intermediate links each provided with two optical transceiver modules (such as the intermediate links Z7 and Z11 in FIG. 8), the optical fiber cables for connecting the optical transceiver modules on these links can be arranged such that the optical fiber cables included in one of the first and second optical fiber cable sets (such as the optical fiber cable sets 39T and 39R in FIG. 8) pass through one, two, two, . . . , and two joints, respectively, in order from one end (only the optical fiber cable at one end passes through one joint, and the remaining optical fiber cables each pass through two joints) and the optical fiber cables included in the other of the first and second optical fiber cable sets pass through two, two, . . . , two, and one joint, respectively, in order from one end (only the optical fiber cable at the other end passes through one joint, and the remaining optical fiber cables each pass through two joints).

In another case where an odd number of intermediate links each provided with a single optical transceiver module are connected in series between the two end links (such as the links Z1 and Z14 in FIG. 8), between one end link and an intermediate link provided with two optical transceiver modules (such as the end link Z1 and the intermediate link Z7 in FIG. 8), or between two intermediate links each provided with two optical transceiver modules (such as the intermediate links Z7 and Z11 in FIG. 8), the optical fiber cables for connecting the optical transceiver modules on these links can be arranged such that the optical fiber cables included in one of the first and second optical fiber cable sets (such as the optical fiber cable sets 39T and 39R in FIG. 8) pass through one, two, . . . , two, and one joint, respectively, in order from one end (the optical fiber cables at either end each pass through one joint, and the remaining optical fiber cables each pass through two joints) and the optical fiber cables included in the other of the first and second optical fiber cable sets each pass through two joints.

In the optical fiber network 39 shown in FIG. 8, the one end link Z1 and the intermediate link Z7 provided with two optical transceiver modules Z0 are connected with each other via an odd number (five) of intermediate links Z2-Z6 each provided with a single optical transceiver module Z0. The optical fiber cables 39T-1, 39T-2, and 39T-3 included in the first optical fiber cable set 39T and connecting between the optical transceiver module ZO on the link Z1 and the optical transceiver module ZO on the link Z7 each pass through two joints ZL. The optical fiber cables 39R-5, 39R-6, 39R-7, and 39R-8 included in the second optical fiber cable set 39R and connecting between the optical transceiver module ZO on the link Z1 and the optical transceiver module ZO on the link Z7 pass through one, two, two, and one joint ZL, respectively. Namely, the optical fiber cables 39R-5 and 39R-8 that are connected to the links Z7 and Z1, respectively, each pass through a single joint ZL, and the remaining optical fiber cables 39R-6 and 39R-7 each pass through two joints ZL. Further, the optical fiber cables 39T-1, 39T-2, and 39T-3, which are included in the first optical fiber cable set 39T and each pass through two joints ZL, and the optical fiber cables 39R-6 and 39R-7, which are included in the second optical fiber cable set 39R and each pass through two joints ZL, are arranged alternately to each other. Thus, each of the optical fiber cables 39T-1 to 39T-3 and 39R-5 to 39R-8, which are routed between the end link Z1 and the intermediate link Z7 provided with two optical fiber modules Z0, passes through one or two joints ZL; namely, the optical transceiver modules ZO on the end link Z1 and the intermediate link Z7 are connected by the optical fiber cables 39T-1 to 39T-3 and 39R-5 to 39R-8 each passing through less than three joints ZL.

The intermediate links Z7 and Z11, each provided with two optical transceiver modules Z0, are connected with each other via an odd number (three) of intermediate links Z8-Z10 each provided with a single optical transceiver module Z0. The optical fiber cables 39T-4, 39T-5, and 39T-6 included in the first optical fiber cable set 39T and connecting between the optical transceiver module ZO on the link Z7 and the optical transceiver module ZO on the link Z11 pass through one, two, and one joint ZL, respectively. Namely, the optical fiber cables 39T-4 and 39T-6 that are connected to the links Z7 and Z11, respectively, each pass through a single joint ZL, and the remaining optical fiber cable 39T-5 passes through two joints ZL. The optical fiber cables 39R-3 and 39R-4 included in the second optical fiber cable set 39R and connecting between the optical transceiver module ZO on the link Z7 and the optical transceiver module ZO on the link Z11 each pass through two joints ZL. Thus, the optical transceiver modules ZO on the intermediate links Z7 and Z7 each provided with two optical transceiver modules are connected by the optical fiber cables 39T-3 to 39T-6 and 39R-3 to 39R-5 each passing through less than three joints ZL.

The intermediate link Z11 provided with two optical transceiver modules Z0 and the other end link Z14 are connected with each other via an even number (two) of intermediate links Z12 and Z13 each provided with a single optical transceiver module Z0. The optical fiber cable 39T-7 and 39T-8 included in the first optical fiber cable set 39T and connecting between the optical transceiver module ZO on the link Z11 and the optical transceiver module ZO on the link Z14 pass through two and one joint ZL, respectively. Namely, only the optical fiber cable 39T-8 connected to the optical transceiver module ZO on the other end link Z14 passes through one joint ZL, and the remaining optical fiber cables (in this case, only the optical fiber cable 39T-7) pass through two joints ZL. The optical fiber cables 39R-1 and 39R-2 included in the second optical fiber cable set 39R and connecting between the optical transceiver module ZO on the link Z11 and the optical transceiver module ZO on the link Z14 pass through two and one joint ZL, respectively. Namely, only the optical fiber cable 39R-2 connected to the optical transceiver module ZO on the link Z11 passes through one joint ZL, and the remaining optical fiber cables (in this case, only the optical fiber cable 39R-1) pass through two joints ZL. Thus, the optical transceiver modules ZO on the intermediate link Z11 and the end link Z14 are connected by the optical fiber cables 39T-7, 39T-8, 39R-1, and 39R-2 each passing through less than three joints ZL.

Thereby, the optical fiber network 39 having a ring topology is configured with the optical fiber cables 39T-1 to 39T-8 and 39R-1 to 39R-8 each passing through less than three joints, and this suppresses the transmission loss in each optical fiber cable.

The preferred embodiments of the present invention have been described in the foregoing, but the present invention is not limited to the foregoing embodiments and various alterations and modifications are possible without departing from the scope of the present invention. For example, different fixing part attenuations may be determined for different types of fixing of the optical fiber cable to the link, such that the transmission loss caused by different types of fixing are calculated separately. It is also possible to evaluate the transmission loss in the optical fiber cable by additionally taking into account the optical signal attenuation caused by connection of the optical fiber cable to the optical transceiver module.

Multiple optical transceiver modules may be provided on at least one of the end links. In such a case, the multiple optical transceiver modules may be connected in series via optical transceiver cables, and the series-connected optical transceiver modules can be treated as a single transceiver module that is connected to optical transceiver modules on other links.

Three or more optical transceiver modules may be provided on an intermediate link. In such a case, one of the three or more optical transceiver modules may be connected to optical transceiver modules on other links by optical fiber cables included in one of the first and second optical fiber cable sets, and the remaining ones of the three or more optical transceiver modules may be connected in series via optical fiber cables such that the series-connected optical transceiver modules can be treated as a single transceiver module that is connected to optical transceiver modules on other links by optical fiber cables included in the other of the first and second optical fiber cable sets. Alternatively, multiple optical transceiver modules on an intermediate link may be connected in series such that the series-connected optical transceiver modules can be treated as a single transceiver module that is connected to transceiver modules on other links.

In the above embodiment, the attenuation relating to transmission through a part of the optical fiber cable other than the parts corresponding to the fixing part(s), coupling(s) and connector(s) is negligibly smaller than the fixing part attenuation $\alpha f$, coupling attenuation $\alpha l$, or connector attenuation $\alpha c$, but it is possible to evaluate the transmission loss in the optical fiber cable by additionally taking into account the attenuation calculated by multiplying the length of the optical fiber cable by the attenuation per unit length of the optical fiber cable.

The invention claimed is:

1. An optical fiber network for transmitting optical signals in a robot having three or more joints connecting a plurality of links in series such that the links include two end links located at either end and intermediate links provided between the two end links, and the links connected by the joints are moveable relative to each other, the optical fiber network comprising:
   a plurality of optical transceiver modules provided on the links such that at least one optical transceiver module is provided on each link; and
   a plurality of optical fiber cables connecting the optical transceiver modules in a ring, each optical fiber cable connecting the optical transceiver modules on different links being configured to bend as the links connected by any of one or more joints passed through by the optical fiber cable move relative to each other;
   wherein at least one end of each optical fiber cable connecting the optical transceiver modules provided on different links is connected to one of the optical transceiver modules provided on the intermediate links, and
   wherein the optical fiber cables are routed such that a transmission loss in each optical fiber cable is less than or equal to a maximum tolerable attenuation determined in relation to the optical transceiver modules connected by the optical fiber cable even when the optical fiber cable is bent at one or more joints passed through by the optical fiber cable as a result of movement of the links connected by the one or more joints.

2. The optical fiber network according to claim 1, wherein each optical fiber cable passes through less than three joints.

3. The optical fiber network according to claim 2, wherein at least one of the optical fiber cables connects the optical transceiver modules provided on a pair of links connected with each other via one link on which at least one optical transceiver module is provided.

4. The optical fiber network according to claim 1, wherein the optical fiber cables are arranged such that a largest of the transmission losses in the optical fiber cables caused due to the joints passed through by the respective optical fiber cables is minimized.

5. The optical fiber network according to claim 1, wherein the plurality of optical fiber cables constitute a first optical fiber cable set carrying optical signals from the optical transceiver module provided on one of the two end links toward the optical transceiver module provided on the other of the two end links without reversing, and a second optical fiber cable set carrying optical signals from the optical transceiver module provided on the other of the two end links toward the optical transceiver module provided on the one of the two end links without reversing.

* * * * *